3,542,843
PROCESS FOR THE PRODUCTION OF ACRYLONITRILE

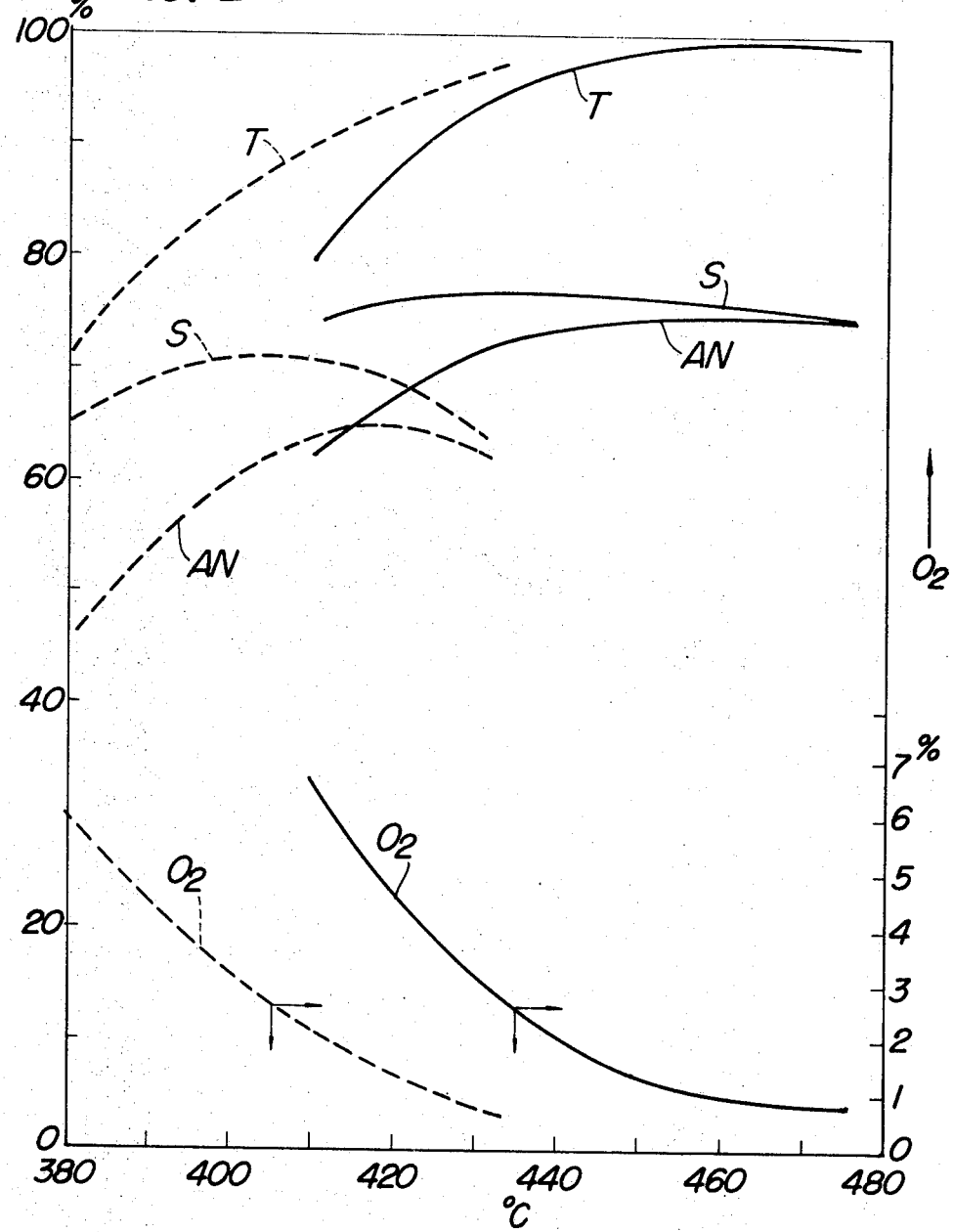

Takachika Yoshino, Yokohama, Shigeru Saito, Fuchu-shi, and Yutaka Sasaki and Isao Nagase, Yokohama, Japan, assignors to Nitto Chemical Industry Co., Ltd., Tokyo, Japan, a corporation of Japan
Filed Apr. 12, 1968, Ser. No. 720,845
Claims priority, application Japan, Apr. 19, 1967, 42/24,550; Nov. 28, 1967, 42/75,892
Int. Cl. C07c 121/02
U.S. Cl. 260—465.3                                 5 Claims

ABSTRACT OF THE DISCLOSURE

This invention provides an improved process for the production of acrylonitrile which comprises contacting a mixture of propylene, molecular oxygen and ammonia in the vapor phase at an elevated temperature with a catalyst having the empirical formula:

$$Fe_{10}Sb_{5-60}Me_{0.05-1}X_{0.005-1}O_{22-141}$$

Figure 1:
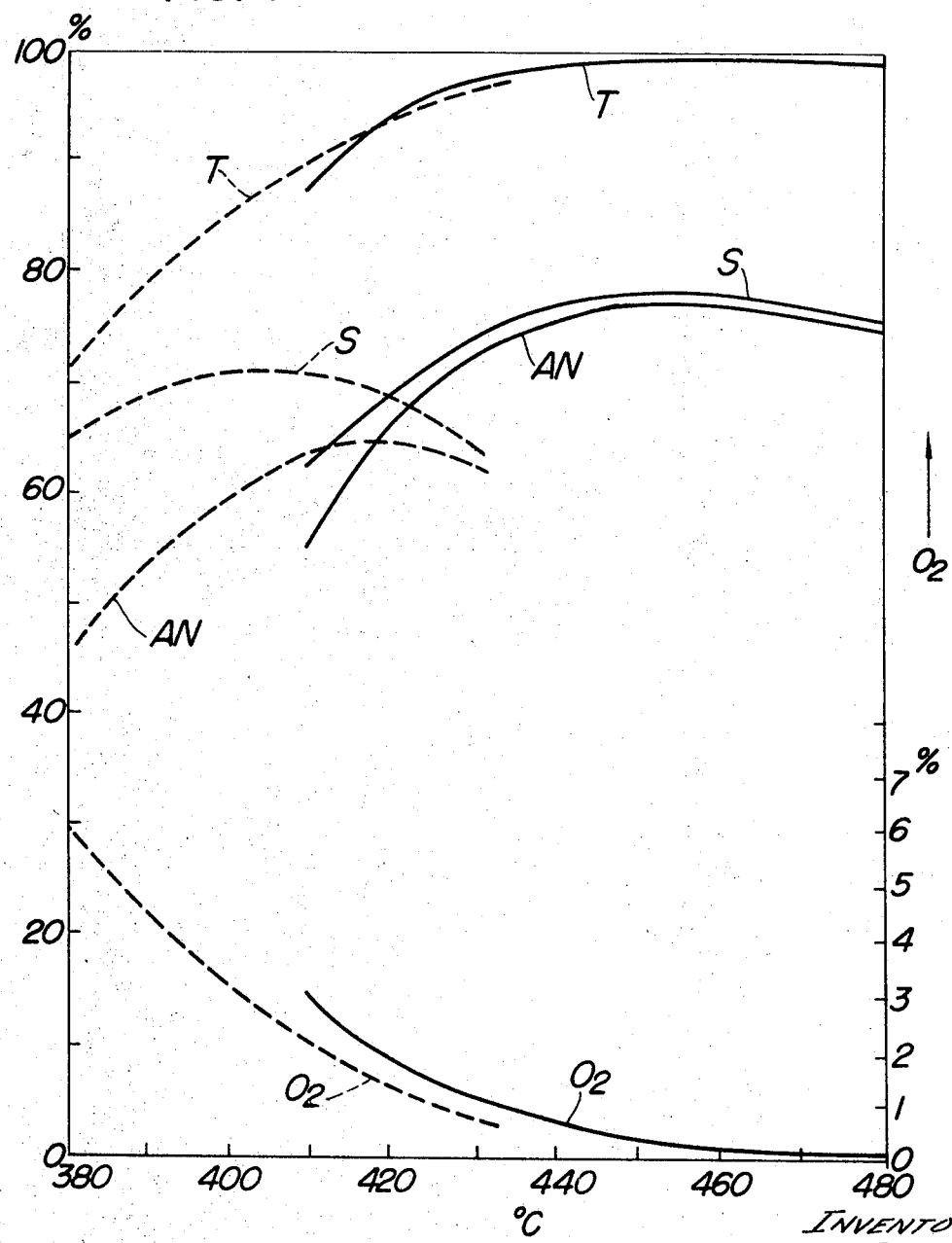

wherein Me represents W or Mo and X represents P or B.

The catalyst mentioned above is distinguished over the promoted or unpromoted iron oxide-antimony oxide catalyst disclosed in the prior art, in the following points:

(1) it comprises a base catalyst system having a specific atomic ratio of Fe/Sb and a particular complex promoter "heteropoly acid of Me and X" being present in an extremely small amount, (2) it exhibits an improved conversion of propylene to acrylonitrile, particularly in the case where high conversion is achieved and the amount of residual oxygen is very small.

For example, the catalysts according to this invention (A-1, A-9, B-1 and B-7), and the catalysts disclosed in the prior art (R-1, R-4 and R-5) are prepared by similar procedures, and the activities thereof are tested by the same method to obtain results as shown in the following table.

It has been independently found by three research groups that an iron oxide-antimony oxide catalyst is useful in the catalytic ammoxidation of olefins to nitriles. See Japanese Pat. No. 420,264; British Pat. No. 983,755; and U.S. Pat. No. 3,197,419.

In general, once a new catalyst has been disclosed, then it is a usual practice in recent catalyst studies to add into said new catalyst various metal and non-metal elements as far as one can realize and examine their promoter effect.

Such studies have been already carried out relating to iron oxide-antimony oxide catalyst. Thus, Belgian Pat. No. 641,143 and the corresponding U.S. Pat. No. 3,338,-952 have attempted the addition of 25 metal elements to this catalyst and disclose their promoter effect. However, said patents disclose nothing relative to the promoter effect of heteropoly-acids. There is concretely shown only the promoter effect of metal elements added in an amount of 1 to 10 percent by weight into only one specific unpromoted iron oxide-antimony oxide catalyst having a very small atomic ratio of Fe/Sb (about 1:9). Also, the unpromoted catalyst has weak activity and the conversion of propylene to acrylonitrile obtained by using the catalyst is only 50 percent per pass. Further, there are not taken into consideration the changes in catalytic activities which would be caused by the quantitative variation of the promoter, by the combined use of the plural promoters and by the variation in the atomic ratio of Fe/Sb in the unpromoted catalysts.

The order of the promoter effect obtained by adding enumerately (without considering their quantitative variation) various metal elements into an unpromoted catalyst having a definite composition is not always kept constant regardless of the variation in the ratio of component elements in the unpromoted catalyst and the variation in the amount of the promoter added. It is rather usual that such an order is considerably affected by these variations. It is impossible at least from knowledge of catalyst chemistry up to the present to predict these relations.

There is a remarkable distinction in both of difficulty and commercial merit between the mere enumeration of

| Cat. No. | Catalyst composition | | | | | | | Optimum reaction temp., °C. | Conversion of propylene to acrylonitrile, percent |
|---|---|---|---|---|---|---|---|---|---|
| | Fe | Sb | Me | | X | | O | (SiO₂)* | |
| | | | W | Mo | P | B | | | |
| A-1 | 10 | 25 | 0.25 | | 0.1 | | 66 | 30 | 450 | 78 |
| A-9 | 10 | 25 | 0.25 | | | 0.1 | 66 | 30 | 460 | 76 |
| B-1 | 10 | 25 | | 0.2 | 0.2 | | 66 | 30 | 450 | 75 |
| B-7 | 10 | 60 | | 0.7 | | 0.5 | 138 | 60 | 450 | 69 |
| R-1 | 10 | 25 | | | | | 65 | 30 | 420 | 65 |
| R-4 | 10 | 25 | | 2.0 | | | 71 | 30 | 430 | 48 |
| R-5 | 10 | 25 | | | 0.5 | | 66 | 30 | 450 | 64 |

* Carrier.

The present invention relates to a process for the production of acrylonitrile through the vapor phase catalytic ammoxidation of propylene.

A main object of this invention is to carry out said reaction advantageously with a catalyst having an improved catalytic activity relating to the formation of acrylonitrile.

The principal feature of this invention is to use of a promoted iron oxide-antimony oxide catalyst having a specific composition which includes a specific promoter consisting of a heteropoly-acid in a specific ratio, in the above-mentioned reaction.

Other objects, features and advantages of the present invention will be apparent from the following description.

as many metal elements as one can remember as a promoter and the actual formation of any optimum promoted catalyst achieved by selecting any combination of specific elements and determinnig the most effective amounts of them added in relation to the component ratio of unpromoted catalyst. The latter can not be anticipated from the former, because in order to reach the latter from the former without any inventive idea, it is necessary to carry out experiments on all possible combinations of metal elements and the number of tests to be carried out is too many to put into practice. Therefore, the latter can be reached from the former only by inventive actions including detailed study of unpromoted catalyst, recognition of desirable promoter effects appreciated through said study, the selection of promoters based on said recognition and any unexpected discovery through study for integrating these.

As an approach to a selection of any optimum promoted catalyst, we carried out detailed study of the characteristics of unpromoted iron oxide-antimony oxide catalyst. The results of the study are illustrated by dotted curves in FIGS. 1 and 2. Referring to FIGS. 1 and 2, abscissa represents reaction temperature (° C.); ordinate (left) represents various percentages showing reaction results, and ordinate (right) represents the concentration of oxygen in the gas leaving the reactor, said concentration being expressed as percent based on dry gas. By dry gas is meants gas components (oxygen, nitrogen, carbon dioxide, carbon monoxide, etc.) except vapor components which condense at ordinary temperature (acrylonitrile, acetonitrile, acrolein, hydrocyanic acid, water, etc.). Also, the symbols as used herein represent the following values, respectively:

T: Total conversion of proylene (%)

$$= \frac{\text{Carbon weight of propylene reacted}}{\text{Carbon weight of propylene charged}} \times 100$$

S: Selectivity of acrylonitrile (%)

$$= \frac{\text{Carbon weight of acrylonitrile formed}}{\text{Carbon weight of propylene reacted}} \times 100$$

AN: Conversion of proylene to acrylonitrile (%)

$$= \frac{\text{Carbon weight of acrylonitrile formed}}{\text{Carbon weight of propylene charged}} \times 100$$

$$= T \times S \times \tfrac{1}{100}$$

$O_2$: Residual $O_2$ in effluent dry gas (%).

Also, the unpromoted iron oxides-antimony oxide catalyst is hereinafter referred to as "Fe-Sb catalyst" or "control catalyst" for the simplication of terms.

Conversion of propylene to acrylonitrile with Fe-Sb-catalyst as shown by dotted lines AN in FIGS. 1 and 2 reaches the highest value of about 65 percent at about 420° C. and has a tendency to gradually decrease at a higher temperature. Why does the conversion to acrylonitrile drop in spite of the fact that 5 percent or more of unreacted propylene still remains In order to study this reason, total conversion of propylene T was determined and selectivity of acrylonitrile S was also calculated.

The results are also shown by dotted line in FIG. 1.

Total conversion T increases with the rise of reaction temperature and reaches about 97 percent at 430° C. Selectivity S is found to tend to rapidly fall after reaching the highest value of about 71 percent at a temperature from 400° to 410° C. Thus, at a temperature above 410° C. a greater part of propylene is consumed by side reaction.

Although conversion to acrylonitrile of 69 percent may be expected from the highest T value of 97 percent and the highest S value of 71 percent, the conversion is in fact only 65 percent since the condition under which the highest T value is obtained is different from the condition under which the highest S value is obtained.

These curves slightly move according to Fe/Sb atomic ratio in the catalyst and others, but the fundamental characteristics of Fe-Sb catalyst as understood by a mutual relation of these curves do not change.

Therefore, we studied a measure for maintaining the ascending tendency of selectivity S up to the point where T shows the highest value.

The effect of temperature on S value seems to be dominant judging from a relationship between S value and reaction temperature (abscissa). However, we have obtained a new knowledge that the S value tends to fall under such a condition that the amount of residual oxygen in reaction gas is a defiinte value or less, almost 3 percent or less, irrelevant to temperature, from the fact that deviation from a relatonship between S value and reaction temperature occurs if Fe/Sb atomic ratio is changed or if the composition of the reaction material is changed.

Thus, we have found that Fe-Sb catalyst is essentially weak in a reducing atmosphere and the reduction of selectivity is caused and in extreme case the permanent degeneration and deterioration of the catalyst is caused if the catalyst is forced to act at a low oxygen concentration.

It is possible to correct this defect to a certain degree by increasing the oxygen concentration in the reactant gases. However, the measure promotes extreme oxidation reactions such as the formation of $CO_2$ on the one hand. Also, the amount of gas to be treated undesirably increases and the cost of equipment increases because air is commercialy used as oxygen source. Therefore, the measure is not necessarily advantageous from all-round point of view. It has been desired to improve the catalytic characteristic in low oxygen concentration atmosphere and to improve selectivity by the study of the catalyst itself.

From this viewpoint we have carried out many fundamental studies for the selection of promoters and we have found that a heteropoly-acid selected from the group consisting of phosphotungstic acid, borotungstic acid, phosphomolybdic acid and boromolybdic acid has a function of maintaining the catalytic activity even in low oxygen concentration area.

The promoted catalyst obtained by combining said heteropoly-acid with the Fe-Sb catalyst was found to have unexpectedly improved effect.

The characteristics of the promoted catalysts having catalytic characteristic in low oxygen concentration atmosphere improved by the addition of said heteropoly-acid are shown by solid lines in FIGS. 1 and 2.

Referring to the solid line in FIG. 1 relating to phosphotungstate-promoted catalyst, total conversion of propylene T as shown by solid line T increases with the rise of temperature and reaches 99 percent at a temperature of about 450° C. and is almost constant at higher temperatures.

On the other hand, selectivity of acrylonitrile as shown by solid line S increases also with the rise of temperature, reaches the highest value of about 79 percent at a temperature of about 450° C. where T reaches 99 percent, and then gradually falls at higher temperatures.

Therefore, conversion to acrylonitrile AN, which is the product of T and S divided by 100, also reaches the highest value of 78 percent at a temperature of about 450° C. A remarkable improvement can be observed as compared with the highest value of 65 percent obtained in the above-mentioned control or unpromoted catalyst. The reason for this is that not only the temperature condition for obtaining the highest S value was successfully shifted to the temperature for obtaining the highest T value but also even the absolute value of the highest S value was unexpectedly increased by the addition of phosphotungstic acid. Further, the condition was such as the concentration of residual oxygen was 0.5 percent or less. Although the composition of the material was the same as in the previous case, more oxygen was consumed owing to the increase of total conversion. Thus, a remarkable effect of the addition of phosphotungstic acid was clear. The promoted catalyst is a stable catalyst which is very easy to handle from the viewpoint of operation control since the area wherein the highest conversion to acrylonitrile can be obtained extends like a plateau centering around a temperature of 450° to 460° C.

Referring to a solid line relating to phosphomolybdate-promoted catalyst in FIG. 2, total conversion of propylene as shown by solid line T increases with the rise of temperature and reaches 97 percent at about 440° C. and 99 percent at about 460° C.

On the other hand, selectivity of acrylonitrile as shown by solid line S increases with the rise of temperature and reaches the highest value of about 77 percent at a temperature of about 440° C. where T reaches 97 percent, In high reaction temperature area where T exceeds 97 percent, S value gradually falls, but the tendency is far slighter than in case of control catalyst (dotted line). The same tendency is found also in the reaction temperature area of about 460° C. where T reaches 99 percent.

Therefore, conversion to acrylonitrile AN which is the product of T and S divided by 100 reaches the highest value of about 75 percent at about 460° C. Thus, a remarkable improvement can be observed as compared with the highest value of 65 percent obtained in the above-mentioned control catalyst. The reason for this is that not only the temperature condition for obtaining the highest S value was successfully shifted to the neighborhood of the temperature for obtaining the highest T value but also even the absolute value of the highest S value was unexpectedly increased by the addition of phosphomolybdic acid. Further, the condition was such as the concentration of residual oxygen was 1 percent or less. (The composition of the material was the same.) Thus, a remarkable effect of the addition of phosphomolybdic acid was clear. The promoted catalyst is a stable catalyst which is very easy to handle from the viewpoint of operation control since the area wherein the highest conversion to acrylonitrile can be obtained extends like a plateau centering around a temperature of 450° to 470° C.

Similar results are obtained using borotungstate-promototed catalyst or koromolybdate-promoted catalysts.

The present invention has been completed, based on the discovery of the above-mentioned new facts, by carrying out studies on the determination of the amount of a heteropoly-acid selected from the group consisting of phosphotungstic acid, borotungstic acid, phophomolybdic acid and boromolybdic acid added to produce the largest effect and the composition of the corresponding control catalyst or base catalyst.

The present invention provides a process for the production of acrylonitrile which comprises contacting a mixture of propylene, oxygen and ammonia in the vapor phase with a catalyst containing a composition of the empirical formula:

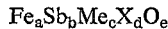

$$Fe_aSb_bMe_cX_dO_e$$

wherein Me is an element selected from the group consisting of tungsten and molybdenum; X is an element selected from the group consisting of phosphorus and boron; and $a$, $b$, $c$, $d$ and $e$ represent atomic ratios and $a=10$
$b=5$ to $60$
$c=0.05$ to $1$
$d=0.005$ to $1$
$e=$ the number of oxygen atoms in the oxide produced by combining the above-mentioned components and corresponds to 22 to 141, as active component.

In the catalyst of the present invention phosphorus or boron and tungsten or molybdenum are not supposed to be present as a separate oxide to produce promoter effect respectively. They show a unique effect when they are present in the form of a heteropoly-acid such as phosphotungstic acid, borotungstic acid, phosphomolybdic acid or boromolybdic acid. In fact, tungsten shows a particularly remarkable promoter effect when tungsten is present together with an amount of phosphorus or boron enough to form phospho-12-tungstic acid $(P_2O_5 \cdot 24WO_3 \cdot 61H_2O)$ or boro-12-tungstic acid $(B_2O_3 \cdot 24WO_3 \cdot 65H_2O)$. Also, molybdenum shows a particularly remarkable effect when molybdenum is present together with an amount of phosphorus or boron enough to form phospho-12-molybdic acid $(P_2O_5 \cdot 24MoO_3 \cdot 61H_2O)$ or boro-12-molybdic acid $(B_2O_3 \cdot 24MoO_3 \cdot 65H_2O)$. However, it is not always necessary to add phosphorus (or boron) and tungsten (or molybdenum) in the form of a heteropoly-acid which has been previously prepared out of the system, but each component may be added in an amount enough to provide the corresponding composition and in a suitable form during the preparation of the catalyst.

It is preferable to add the tungsten or molybdenum component at an atomic ratio from 0.05 to 1 per 10 of iron component. If more tungsten or molybdenum component is added, although the action of suppressing "degradation in low oxygen content" i.e. "the tendency of the decrease of selectivity with the decrease of the amount of residual oxygen in the gas formed" remains unchanged, the absolute value of selectivity undesirably falls. Also, if less tungsten or molybdenum component is added, its action of suppressing "degradation in low oxygen content" undesirably decreases.

The phosphorus or boron component is preferably added at an atomic ratio from 0.005 to 1 per 10 of iron. Although it is desirable that the phosphorus or boron component is present in an amount enough to form a heteropoly-acid with tungsten or molybdenum, at an atomic ratio of phosphorus or boron to tungsten or molybdenum of 1 or more to 12, a small amount of tungsten or molybdenum may be present in a free state without constituting the heteropoly-acid.

An atomic ratio of iron to antimony should be within the range from 10:5 to 10:60, preferably within the range from 10:10 to 10:60. This is an experimentally determined range wherein the highest promoter effect is produced and high conversion to acrylonitrile can be obtained.

The catalyst having the above-mentioned composition can be produced by any known method, although it is particularly necessary that the components are intimately mixed and combined. The strict chemical structure of a material constituting the catalyst is unknown but said empirical formula is obtained as analytical value.

The starting material for providing the iron component of the catalyst can be selected from many members. For example, iron oxide in the form of ferrous oxide, ferric oxide or ferro-ferric oxides can be used. Also, such compounds as are finally stabilized as iron oxide after chemical treatment, calcining treatment or the like may be used. Those compounds include iron salts of inorganic acid such as iron nitrate and iron chloride, iron salts of organic acid such as iron acetate and iron oxalate, etc. The salts can be converted into oxide by neutralizing them with an alkali such as ammonia, water, etc. to form iron hydroxide and then calcining said iron hydroxide or by directly calcining these salts. Further, iron hydroxide or metallic iron can be used. The metallic iron may be added in the form of fine powder or may be treated with heated nitric acid. In the latter case iron is converted into ferric nitrate. Whatever starting material is selected, it is important to intimately mix the material with other components. Therefore, it is preferably added in the form of fine powder, aqueous solution or sol.

The starting material for the antimony component may be antimony oxide such as, for example, antimony trioxide, antimony tetroxide or antimony pentoxide. Also, such compounds as are finally stabilized as antimony oxide after chemical treatment, calcining treatment or the like may be used. For example, those compounds include hydrous antimony oxide, metaantimonic acid, orthoantimonic acid, pyroantimonic acid or the like. Also, hydrolyzable antimony salts such as antimony halides, for example, antimony trichloride and antimony pentachloride may be used. These antimony halides are hydrolyzed with water into hydrous oxides. The antimony halides may be used as they are since they are volatile at high temperatures.

Any one of water soluble or insoluble tungsten compounds can be used as the tungsten component. For example, tungsten trioxide, tungstic acid, ammonium paratungstate, ammonium metatungstate, tungsten halides or the like may be used. Also, the tungsten component may be added in the form of the above-mentioned phosphotungstic acid or borotungstic acid. Further, metallic tungsten can be used. It may be directly used in the form of powder or may be reacted with heated nitric acid to form oxide.

Any one of water soluble or insoluble molybdenum compounds can be used as the molybdenum component. For example, molybdenum trioxide, molybdic acid, ammonium paramolybdate, ammonium metamolybdate, molybdenum halides or the like may be used. Also, the molybdenum component may be added in the form of the above-mentioned phosphomolybdic acid or boromolybdic acid. Further, metallic molybdenum can be used. It may be directly used in the form of powder or may be reacted with heated nitric acid to form oxide.

It is desirable to prepare the catalyst by mixing the tungsten component or the molybdenum component with the iron and antimony component intimately. Alternatively, a control catalyst may be prepared and then impregnated with the tungsten or molybdenum component. In this case, it is preferable to prepare an aqueous solution of a tungsten or a molybdenum compound and to dip said control catalyst in the aqueous solution to effect impregnation. The impregnation operation is preferably carried out before final calcining treatment.

In the above-mentioned impregnation of the control catalyst, the phosphorus or boron component may be added to the aqueous solution of the tungsten or molybdenum component, or the control catalyst may be separately impregnated with the phosphorus or boron component, or the control catalyst may contain the phosphorus or boron component.

The starting material for the phosphorus or boron component may be any phosphorus or boron compound, but it is most convenient to add the component in the form of phosphoric acid or boric acid. Also, the component may be added in the form of the above-mentioned phosphotungstic acid, phosphomolybdic acid, borotungstic acid or boromolybdic acid.

The activity of this catalyst system may be increased by heating at a high temperature. The catalyst material composition which has been prepared to provide the desired composition and has been intimately mixed is preferably dried, heated at a temperature of 200° to 600° C. for 2 to 24 hours and, if necessary, then heated at a temperature within a range of 700° to 1100° C. for 1 to 48 hours. The materials should be blended so that the catalyst may have a fixed composition when the catalyst is used in the reaction after the calcining treatment.

The catalyst can show excellent activity even without any carrier, but it may be combined with any suitable carrier. The catalyst may contain 10 to 90 percent by weight of an active component and 90 to 10 percent by weight of a carrier component. As a carrier silica, alumina, zirconia, silica alumina, silicon carbide, Alundum, inorganic silicate, etc. may be used.

Any other additives such as a bonding agent, which serve for improving the physical properties of the catalyst, may be optionally added unless they impair the activity of the catalyst.

These additives such as a carrier, a bonding agent, an extender, etc. can be optionally added irrespective of their components unless they remarkably change the characteristics of the catalyst of the present invention disclosed by the above explanation or the examples mentioned below. The catalyst containing these additives should be also regarded as the catalyst of the present invention.

The catalyst may be used in a fixed-bed reaction in the form of pellet or may be used in a fluid-bed reaction in the form of fine grain.

The reaction conditions for the use of the catalyst of the present invention will be explained below.

Any oxygen source may be used, but air is usually used for economical reasons. Air may be suitably enriched with oxygen. The molar ratio of oxygen to propylene may be within the range from about 0.5:1 to about 5:1, and more desirably is 1:1 or higher. Preferable molar ratio is in the range from about 2:1 to about 3:1.

The molar ratio of ammonia to propylene is suitably within the range from about 0.7:1 to about 3:1, but it is substantially unnecessary that the molar ratio is 1.5:1 or higher because the catalyst of the present invention does not decompose ammonia. The fact that ammonia is not decomposed is advantageous in that the use of excess ammonia is unnecessary and no oxygen loss is caused by the consumption of oxygen for the decomposition of ammonia and thereby the molar ratio of oxygen to propylene can be maintained at a sufficiently high value during the reaction. This contributes to the improvement of conversion to acrylonitrile.

Previous known bismuth phosphomolybdate catalyst has a defect that its ammonia decomposition ability is high. According to our experiment, it is required to suppress the decomposition of ammonia that not less than three mols of water per mol of propylene is added. On the other hand, the present invention requires substantially no addition of water. The addition of water is disadvantageous from thermal and operational viewpoints. However, the addition of water is somewhat effective for suppressing the formation of carbon dioxide, and water may be added in the present invention, if necessary. In that case, not more than three mols of water per mol of propylene is sufficient.

As is clear from the fact that air which is a mixture of oxygen and nitrogen can be used as the oxygen source instead of pure oxygen, any suitable diluent may be used.

It is not always necessary to charge propylene, oxygen, ammonia and any diluent used into a reactor in the form of gas or a mixture. If desired, liquefiable components may be charged in the form of liquid. Also, these materials may be charged separately into the reactor through a few inlets. These materials should be in the form of a gaseous mixture when they are contacted with the catalyst. The reaction temperature is suitably about 350° to about 55° C. and reaction temperature of about 400° to 500° C. gives particularly good results. It is preferable from operational point of view to carry out the reaction at about atmospheric pressure, but, if necessary, the reaction may be carried out at reduced pressure or under pressure.

Space velocity is also one of the reaction conditions in a vapor phase catalytic reaction using a solid catalyst. In the process of the present invention, space velocity of about 1500 to about 100 hr.$^{-1}$ is suitable and space velocity of about 400 to about 200 hr.$^{-1}$ gives particularly good results. By space velocity is meant the volume (calculated in NTP) of gas passing per unit volume of catalyst per hour.

Desired acrylonitrile can be recovered from the reaction product by washing the gas leaving the reactor through its exit with cold water or a solvent which is suitable for the extraction of acrylonitrile. Any other recovery process which is customarily used in this kind of reaction may be used.

In the practice of the present invention, any one of the fixed-bed type, moving-bed type and fluid-bed type catalytic apparatuses which are customarily used in vapor phase catalytic reactions can be used.

The constitution and effect of the present invention are illustrated by the following examples and comparative examples.

Test method is carried out as follows:

50 ml. of a catalyst which has been formed into a 4 mm. x 4 mm. $\phi$ pellet is charged into a steel U-tube having an inside diameter of 16 mm. The content is heated by niter consisting of a 1:1 mixture of sodium nitrite and potassium nitrate.

Into the reactor is introduced a gas having the following composition at a rate of 10 liters per hour (NTP). The reaction pressure is nearly atmospheric pressure.

$O_2$ (supplied as air)/propylene=2.2:1 (molar ratio)
$NH_3$/propylene=1.3:1 (molar ratio)

The temperature of niter is successively changed and the reaction is carried out for several hours at each temperature.

The reaction gas is recovered and is then analyzed by gas chromatography.

For each catalyst, the optimum temperature for providing the highest conversion of propylene to acrylonitrile as well as the conversion and selectivity obtained at said optimum temperature are determined.

COMPARATIVE EXAMPLE 1

An unpromoted (control catalyst having an empirical formula $Fe_{10}Sb_{25}O_{65}(SiO_2)_{30}$ was prepared as follows:

61 grams of metallic antimony powder (200 mesh or finer) was added in portions into 230 ml. of heated nitric acid (specific gravity: 1.38). After all of the antimony had been added and the generation of brown gas had ceased, the mixture was allowed to stand at room temperature for 16 hours. Excess nitric acid was then removed and the precipitate formed was washed three times with 100 ml. of water (I).

11.2 grams of electrolytic iron powder was added in portions into a mixture consisting of 81 ml. of nitric acid (specific gravity: 1.38) and 100 ml. of water to completely dissolve (II).

180 grams of silica sol ($SiO_2$: 20 percent by weight) was used as a carrier component (III).

These three components were mixed. An aqueous ammonia solution (28 percent) was added in portions with stirring to adjust the mixture to pH 2. The mixture was then boiled to dryness with stirring.

These three components were mixed. An aqueous ammonia solution (28 percent) was added in portions with stirring to adjust the mixture to pH 2. The mixture was then boiled to dryness with stirring.

The dry residue was crushed and then calcined at 200° C. for 2 hours and at 400° C. for 2 hours. The product was kneaded with water and then formed into 4 mm. x 4 mm. $\phi$ pellets. It was dried at 130° C. for 16 hours and then calcined in air at 900° C. for 2 hours.

The catalyst thus obtained was tested under the abovementioned conditions, and the results as shown by dotted lines in FIGS. 1 and 2 and in Tables 1 and 2 were obtained. Thus, the catalyst showed a tendency for selectivity to fall in low oxygen content area and the conversion to acrylonitrile at the optimum temperature was only about 65 percent.

EXAMPLE 1A

A promoted catalyst having an empirical formula $Fe_{10}Sb_{25}W_{0.25}P_{0.1}O_{66} \cdot (SiO_2)_{30}$ (W is 0.71 percent by weight and P is 0.048 percent by weight based on the weight of the Fe-Sb-Si system control catalyst) was prepared as follows:

61 grams of metallic antimony powder (200 mesh or finer) was added in portions into 230 ml. of heated nitric acid (specific gravity: 1.38). After all of the antimony had been added and the generation of brown gas had ceased, the mixture was allowed to stand at room temperature for 16 hours. Excess nitric acid was then removed and the precipitate formed was washed three times with 100 ml. of water (I).

11.2 grams of electrolytic iron powder was added in portions into a mixture consisting of 81 ml. of nitric acid (specific gravity: 1.38) and 100 ml. of water to completely dissolve (II).

1.3 grams of ammonium tungstate

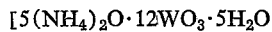

described in Merck Index] was dissolved in 50 ml. of water (III).

2 ml. of a solution obtained by diluting 115 grams of phosphoric acid (85 percent) with water to 100 ml. was used (IV).

As a carrier component 180 grams of silica sol ($SiO_2$: 20 percent by weight) was used (V).

These five components were intimately mixed and aqueous ammonia solution (28 percent) was added in portions with stirring to adjust the mixture to pH 2. The mixture was then boiled to dryness.

The dry residue was crushed and then calcined at 200° C. for 2 hours and at 400° C. for 2 hours. The product was kneaded with water and then formed into 4 mm. x 4 mm. $\phi$ pellets. It was dried at 130° C. for 16 hours and then calcined at 900° C. for 2 hours.

The catalyst thus prepared was tested and the result as shown by solid line in FIG. 1 and in Table 1 was obtained. Thus, the catalyst showed total conversion of propylene of about 100 per cent and maintained a tendency for selectivity to increase up to low oxygen content area where the amount of residual oxygen was 1 percent or less. Further, the absolute value of the selectivity was high. Therefore, conversion to acrylonitrile was about 78 percent which was 13 percent higher in the absolute value and 20 percent higher in the relative value than in Comparative Example 1.

EXAMPLE 2

A promoted catalyst having an empirical formula

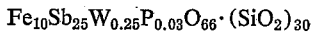

(W is 0.71 percent by weight and P is 0.014 percent by weight based on the weight of the Fe-Sb-Si system control catalyst) was prepared in the same manner as in Example 1A except that 1 ml. of a solution obtained by diluting 6.9 grams of phosphoric acid (85 percent) with water to 100 ml. is used as the phosphorus component (final calcining: 900° C., 2 hours).

The test result of the catalyst thus obtained is shown in Table 1.

EXAMPLE 3A

A promoted catalyst having an empirical formula

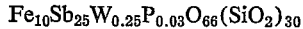

(W is 0.71 percent by weight and P is 0.014 percent by weight based on the weight of the Fe-Sb-Si system control catalyst) was prepared as follows:

Antimony oxychloride precipitate was prepared by adding 3 l. of water to 114 grams of antimony trichloride $SbCl_3$, stirring the mixture thoroughly, hydrolyzing and then allowing the mixture to stand. The precipitate was filtered off, washed twice with 200 ml. of water and then suspended in 1 l. of water (I).

11.2 grams of electrolytic iron powder was added in portions into a mixture consisting of 81 ml. of nitric acid (specific gravity: 1.38) and 100 ml. of water to completely dissolve (II).

1.3 grams of ammonium tungstate was dissolved in 50 ml. of water (III).

1 ml. of a solution obtained by diluting 6.9 grams of phosphoric acid (85 percent) with water to 100 ml. was used (IV).

180 grams of silica sol ($SiO_2$: 20 percent by weight) was used as a carrier component.

These five components were intimately mixed and boiled with vigorous stirring. Thus, antimony oxychloride was hydrolyzed into antimony oxide and hydrochloric acid produced was vented into air.

After evaporating to dryness, the reaction product was formed and calcined in the same manner as in Example 1A (final calcining: 900° C., 2 hours).

The test result of the catalyst thus obtained is shown in Table 1.

EXAMPLE 4A

A promoted catalyst having an empirical formula $$Fe_{10}Sb_{25}W_{0.25}P_{1.0}O_{68} \cdot (SiO_2)_{30}$$

(W is 0.71 percent by weight and P is 0.48 percent by weight based on the weight of the control catalyst) (final calcining: 850° C., 5 hours).

EXAMPLE 5A

A promoted catalyst having an empirical formula $$Fe_{10}Sb_{25}W_{0.1}P_{0.01}O_{65} \cdot (SiO_2)_{30}$$

(W is 0.29 percent by weight and P is 0.005 percent by weight based on the weight of the control catalyst) (final calcining: 900° C., 2 hours).

EXAMPLE 6A

A promoted catalyst having an empirical formula $$Fe_{10}Sb_{60}W_{0.5}P_{0.1}O_{137} \cdot (SiO_2)_{60}$$

(W is 0.67 percent by weight and P is 0.023 percent by weight based on the weight of the control cataylst) (final calcining: 850° C., 5 hours).

EXAMPLE 7A

A promoted catalyst having an empirical formula $$Fe_{15}Sb_{20}W_{0.5}P_{0.1}O_{64} \cdot (SiO_2)_{30}$$

(W is 1.51 percent by weight and P is 0.051 percent by weight based on the weight of the control cataylst) (final calcining: 950° C., 2 hours).

EXAMPLE 8A

A promoted catalyst having an empirical formula $$Fe_{15}Sb_{20}W_{0.25}P_{0.03}O_{63} \cdot (SiO_2)_{30}$$

(W is 0.76 percent by weight and P is 0.015 percent by weight based on the weight of the control catalyst) (final calcining: 950° C., 2 hours).

The catalysts described in Examples 4A to 8A above were prepared in the same manner as in Example 1A and tested under the above-mentioned conditions. The test results are shown in Table 1.

EXAMPLE 9A

A promoted catalyst having an empirical formula $$Fe_{10}Sb_{25}W_{0.25}B_{0.1}O_{66} \cdot (SiO_2)_{30}$$

(W is 0.71 percent by weight and B is 0.017 percent by weight based on the weight of control catalyst) was prepared as follows:

61 grams of metallic antimony powder (200 mesh or finer) was adder in portions into 225 ml. of heated nitric acid (specific gravity: 1.38). After all of the antimony had been added and the generation of brown gas had ceased, the mixture was allowed to stand at room temperature for 16 hours (I).

11.2 grams of electrolytic iron powder was added in portions into a mixture consisting of 81 ml. of nitric acid (specific gravity: 1.38) and 100 ml. of water to completely dissolve (II).

1.3 grams of ammonium tungstate (described in Merck Index, $$5(NH_4)_2O \cdot 12WO_3 \cdot 5H_2O)$$

was dissolved in 50 ml. of water (III).

0.124 gram of boric acid $H_3BO_3$ was used (IV).

180 grams of silica sol ($SiO_2$: 20 percent by weight) was used as a carrier component (V).

Boric acid (IV) was added to the aqueous solution of ammonium tungstate (III) and the mixture was heated to dissolve. The other three components (I), (II), and carrier (V) were then added and aqueous ammonia solution (28 percent) was added in portions with stirring to adjust the mixture to pH 2.

Thereafter forming and calcining were carried out in the same manner as in Example 1A (final calcining: 900° C., 2 hours).

The test result of the catalyst thus obtained is shown in Table 1.

COMPARATIVE EXAMPLE 2A

An unpromoted catalyst having an empirical formula $Fe_{10}Sb_{25}O_{65} \cdot (SiO_2)_{30}$ was prepared as follows:

3 liter of water was added to 114 grams of antimony trichloride $SbCl_3$. The mixture was thoroughly stirred and then hydrolyzed. After allowing to stand, antimony oxychloride precipitate was formed. The precipitate was filtered off, washed twice with 200 ml. of water and then suspended in 1 l. of water (I).

11.2 grams of electrolytic iron powder was added in portions into a mixture consisting of 81 ml. of nitric acid (specific gravity: 1.38) and 100 ml. of water to completely dissolve (II).

180 grams of silica sol ($SiO_2$: 20 percent by weight) was used as a carrier component (III).

These three components were thoroughly mixed. The mixture was boiled with vigorous stirring. Thus, antimony oxychloride was hydrolyzed into antimony oxide, and hydrochloric acid produced was vented into air.

After evaporating to dryness, forming and calcining were carried out in the same manner as in Comparative Example 1 (final calcining: 900° C., 2 hours).

The test result of the catalyst thus obtained is shown in Table 1.

COMPARATIVE EXAMPLE 3A

An unpromoted catalyst having an empirical formula $Fe_{10}Sb_{60}O_{135} \cdot (SiO_2)_{60}$ (final calcining: 850° C., 5 hours).

COMPARATIVE EXAMPLE 4A

An unpromoted catalyst having an empirical formula $Fe_{15}Sb_{20}O_{63} \cdot (SiO_2)_{30}$ (final calcining: 950° C., 2 hours).

These catalysts were prepared in the same manner as in Comparative Example 1 and then tested. The results are shown in Table 1.

Example 1B

A promoted catalyst having an empirical formula $$Fe_{10}Sb_{25}Mo_{0.2}P_{0.2}O_{66} \cdot (SiO_2)_{30}$$

(Mo is 0.30 percent by weight and P is 0.096 percent by weight based on the weight of the Fe-Sb-Si system control catalyst) was prepared as follows:

61 grams of metallic antimony powder (100 mesh or finer) was added in portions into 230 ml. of heated nitric acid (specific gravity: 1.38). After all of the antimony had been added and the generation of brown gas had ceased, the mixture was allowed to stand at room temperature for 16 hours. Excess nitric acid was then removed and the precipitate formed was washed three times with 100 ml. of water (I).

11.2 grams of electrolytic iron powder was added in portions into a mixture consisting of 81 ml. of nitric acid (specific gravity: 1.38) and 100 ml. of water to completely dissolved (II).

0.71 gram of ammonium molybdate $$[3(NH_4)_2O \cdot 7MoO_3 \cdot 4H_2O]$$

was dissolved in 50 ml. of water.

0.46 gram of phosphoric acid (85 percent) was dissolved in the ammonium molybdate solution as prepared above (III).

180 grams of silica sol ($SiO_2$: 20 percent by weight) was used as a carrier (IV).

Component (II) was first mixed with component (IV). To this mixture component (III) was added. The resultant solution was mixed with component (I). Aqueous ammonia solution (28 percent) was added in portions to the mixture with thorough stirring to adjust the mixture to pH 2.

The mixture was then heated to dryness with stirring.

The dry residue was crushed and calcined at 200° C. for 2 hours and then at 400° C. for 2 hours. The product was kneaded with water and formed into 4 mm. x 4 mm. φ pellets. It was dried at 130° C. for 16 hours and then calcined at 900° C. for 2 hours.

The catalyst thus prepared was tested under the above-mentioned conditions, and the result as shown by solid line in FIG. 2 and in Table 2 was obtained.

Thus, the catalyst showed total conversion to propylene of 97 percent and maintained a tendency for selectivity to increase up to low oxygen content area where the amount of residual oxygen was about 2 percent. Further, the fall of selectivity was very slight even in lower oxygen content area. The selectivity was kept at 76 percent in reaction temperature area of about 460° C. where total conversion to propylene reached 99 percent. Therefore, conversion to acrylonitrile was about 75 percent which was 10 percent higher in the absolute value and about 15 percent higher in the relative value than in Comparative Example 1.

Example 2B

A promoted catalyst having an empirical formula $$Fe_{10}Sb_{25}Mo_{0.5}P_{0.5}O_{68} \cdot (SiO_2)_{30}$$

(Mo is 0.75 percent by weight and P is 0.23 percent by weight based on the weight of the control catalyst).

Example 3B

A catalyst having an empirical formula $$Fe_{10}Sb_{25}Mo_{0.1}P_{0.01}O_{65} \cdot (SiO_2)_{30}$$

(Mo is 0.15 percent by weight and P is 0.005 percent by weight based on the weight of the control catalyst).

Example 4B

A promoted catalyst having an empirical formula $$Fe_{10}Sb_{25}Mo_{0.2}B_{0.5}O_{66} \cdot (SiO_2)_{30}$$

(Mo is 0.30 percent by weight and B is 0.084 percent by weight based on the weight of the control catalyst).

Example 5B

A promoted catalyst having an empirical formula $Fe_{10}Sb_{25}Mo_{0.2}P_{0.2}B_{0.2}O_{66} \cdot (SiO_2)_{30}$ (Mo is 0.30 percent by weight, P is 0.096 percent by weight and B is 0.033 percent by weight based on the weight of the control catalyst).

Example 6B

A promoted catalyst having an empirical formula $Fe_{10}Sb_{60}Mo_{0.2}P_{0.5}O_{137} \cdot (SiO_2)_{60}$ (Mo is 0.14 percent by weight and P is 0.11 percent by weight based on the weight of the control catalyst).

Example 7B

A promoted catalyst having an empirical formula $Fe_{10}Sb_{60}Mo_{0.2}P_{0.5}O_{137} \cdot (SiO_2)_{60}$ (Mo is 0.14 percent by weight and B is 0.04 percent by weight based on the weight of the control catalyst).

Example 8B

A promoted catalyst having an empirical formula $Fe_{10}Sb_{13}Mo_{0.1}P_{0.2}O_{42} \cdot (SiO_2)_{20}$ (Mo is 0.24 percent by weight and P is 0.15 percent by weight based on the weight of the control catalyst).

Example 9B

A promoted catalyst having an empirical formula $Fe_{10}Sb_{13}Mo_{0.1}B_{0.2}O_{42} \cdot (SiO_2)_{20}$ (Mo is 0.24 percent by weight and B is 0.054 percent by weight based on the weight of the control catalyst).

Example 10B

A promoted catalyst having an empirical formula $Fe_{10}Sb_7Mo_{0.1}P_{0.8}O_{31} \cdot (SiO_2)_{20}$ (Mo is 0.31 percent by weight and P is 0.80 percent by weight based on the weight of the control catalyst).

The catalysts described in Examples 2B to 10B above were prepared in the same manner as in Example 1B and tested under the above-mentioned conditions. The test results obtained and final calcining conditions for the catalysts are shown in Table 2.

COMPARATIVE EXAMPLE 2B

An unpromoted (control) catalyst having an empirical formula $Fe_{10}Sb_{60}O_{135} \cdot (SiO_2)_{60}$ was prepared as follows:

73.3 grams of metallic antimony powder (100 mesh or finer) was added in portions into 270 cc. of heated nitric acid (specific gravity: 1.38). After all of the antimony had been added and the generation of brown gas had ceased, the mixture was allowed to stand at room temperature for 16 hours. Excess nitric acid was then removed and the precipitate formed was washed five times with 200 ml. of water (I).

5.6 grams of electrolytic iron powder was added in portions into a mixture consisting of 41 ml. of nitric acid (specific gravity: 1.38) and 50 ml. of water to completely dissolve (II).

180 grams of silica sol ($SiO_2$: 20 percent by weight) was used as a carrier component (III).

These three components (I), (II) and (III) were mixed. Aqueous ammonia solution (28 percent) was added in portions with stirring to adjust the mixture to pH 2. The slurry was then boiled to dryness with stirring.

The dry residue was crushed and calcined at 200° C. for 2 hours and then at 400° C. for 2 hours. The product was kneaded with water and formed into 4 mm. x 4 mm. φ pellets. It was dried at 130° C. for 16 hours and then calcined in air at 850° C. for 5 hours.

COMPARATIVE EXAMPLE 3B

An unpromoted (control) catalyst having an empirical formula $Fe_{10}Sb_{13}O_{41} \cdot (SiO_2)_{20}$ was prepared in the same manner as in Comparative Example 2B.

COMPARATIVE EXAMPLE 4B

A catalyst having an empirical formula $$Fe_{10}Sb_{25}Mo_{2.0}O_{71} \cdot (SiO_2)_{30}$$

(Mo is 2.98 percent by weight based on the weight of the control catalyst) was prepared in the same manner as in Example 1B.

COMPARATIVE EXAMPLE 5B

A catalyst having an empirical formula $$Fe_{10}Sb_{25}P_{0.5}O_{66} \cdot (SiO_2)_{30}$$

(P is 0.24 percent by weight for a control catalyst) was prepared in the same manner as in Example 1B.

The catalysts described in Comparative Examples 2B to 5B above were subjected to activity test under the above-mentioned conditions. The test results obtained and final calcining conditions for the catalysts are shown in Table 2. Comparative Example 4B shows that a satisfactory yield of acrylonitrile can not be obtained with a catalyst containing the Mo component in an amount exceeding the range prescribed by the present invention.

TABLE 1

| | Composition of catalyst (atomic ratio) | | | | | Optimum calcining conditions | | Optimum reaction temp. (°C.) | Conversion of propylene percent | | | | | | Total conversion percent | AN selectivity percent |
|---|---|---|---|---|---|---|---|---|---|---|---|---|---|---|---|---|
| | Fe | Sb | W | X | Si | Temp. (°C.) | Time (hrs.) | | AN | CO$_2$ | CO | HCN | ATN | AL | | |
| Example Number: | | | | | | | | | | | | | | | | |
| 1A | 10 | 25 | 0.25 | 0.1 | 30 | 900 | 2 | 450 | 78 | 8 | 5 | 8 | tr | tr | 99 | 79 |
| 2A | 10 | 25 | 0.25 | 0.03 | 30 | 900 | 2 | 450 | 74 | 10 | 5 | 9 | 1 | tr | 99 | 75 |
| 3A | 10 | 25 | 0.25 | 0.03 | 30 | 900 | 2 | 480 | 75 | 9 | 5 | 8 | tr | tr | 97 | 77 |
| 4A | 10 | 25 | 0.25 | 1.0 | 30 | 850 | 5 | 440 | 70 | 6 | 2 | 9 | tr | 1 | 88 | 80 |
| 5A | 10 | 25 | 0.1 | 0.01 | 30 | 900 | 2 | 430 | 72 | 11 | 4 | 8 | 1 | tr | 96 | 75 |
| 6A | 10 | 60 | 0.5 | 0.1 | 60 | 850 | 5 | 440 | 70 | 7 | 3 | 8 | 2 | 1 | 91 | 77 |
| 7A | 15 | 20 | 0.5 | 0.1 | 30 | 950 | 2 | 470 | 73 | 9 | 3 | 7 | tr | tr | 92 | 79 |
| 8A | 15 | 20 | 0.25 | 0.03 | 30 | 950 | 2 | 450 | 77 | 8 | 5 | 7 | 1 | tr | 98 | 79 |
| 9A | 10 | 25 | 0.25 | 0.1 | 30 | 900 | 2 | 460 | 76 | 9 | 4 | 8 | 1 | tr | 98 | 78 |
| Comparative Example: | | | | | | | | | | | | | | | | |
| 1 | 10 | 25 | 0 | 0 | 30 | 900 | 2 | 420 | 65 | 17 | 6 | 5 | 1 | tr | 94 | 69 |
| 2A | 10 | 25 | 0 | 0 | 30 | 900 | 2 | 450 | 67 | 10 | 5 | 7 | tr | 2 | 91 | 74 |
| 3A | 10 | 60 | 0 | 0 | 60 | 850 | 5 | 450 | 66 | 10 | 6 | 8 | 2 | 2 | 94 | 70 |
| 4A | 15 | 20 | 0 | 0 | 30 | 950 | 2 | 440 | 65 | 15 | 8 | 9 | 1 | tr | 98 | 66 |

Note.—AN=Acrylonitrile; ATN=Acetonitrile; AL=Acrolein; tr=Trace; X=Phosphorus except that X is boron only in Example 9A.

TABLE 2

| | Composition of catalyst (atomic ratio) | | | | | | Calcining conditions | | Optimum reaction temp. (°C.) | Conversion of propylene (percent) | | | | | | Total conversion (percent) | AN selectivity (percent) |
|---|---|---|---|---|---|---|---|---|---|---|---|---|---|---|---|---|---|
| | Fe | Sb | Mo | P | B | Si | Temp. (°C.) | Time (hrs.) | | AN | CO$_2$ | CO | HCN | ATN | AL | | |
| Example Number: | | | | | | | | | | | | | | | | | |
| 1B | 10 | 25 | 0.2 | 0.2 | 0 | 30 | 900 | 2 | 450 | 75 | 9 | 5 | 9 | 1 | 0 | 99 | 76 |
| 2B | 10 | 25 | 0.5 | 0.5 | 0 | 30 | 900 | 2 | 450 | 70 | 12 | 4 | 8 | 1 | tr | 95 | 74 |
| 3B | 10 | 25 | 0.1 | 0.01 | 0 | 30 | 900 | 2 | 440 | 71 | 11 | 4 | 8 | 1 | tr | 95 | 75 |
| 4B | 10 | 25 | 0.2 | 0 | 0.5 | 30 | 900 | 2 | 440 | 74 | 10 | 6 | 7 | 1 | 0 | 98 | 76 |
| 5B | 10 | 25 | 0.2 | 0.2 | 0.2 | 30 | 900 | 2 | 460 | 74 | 10 | 5 | 8 | 0 | 0 | 97 | 76 |
| 6B | 10 | 60 | 0.2 | 0.5 | 0 | 60 | 850 | 2 | 470 | 73 | 9 | 4 | 9 | 0 | 0 | 95 | 77 |
| 7B | 10 | 60 | 0.7 | 0 | 0.5 | 60 | 900 | 2 | 450 | 69 | 11 | 5 | 8 | 0 | 0 | 93 | 74 |
| 8B | 10 | 13 | 0.1 | 0.2 | 0 | 20 | 950 | 2 | 460 | 71 | 10 | 5 | 9 | 0 | 0 | 95 | 75 |
| 9B | 10 | 13 | 0.1 | 0 | 0.2 | 20 | 950 | 2 | 460 | 70 | 11 | 6 | 10 | tr | 0 | 97 | 72 |
| 10B | 10 | 7 | 0.1 | 0.8 | 0 | 20 | 950 | 2 | 450 | 69 | 16 | 7 | 6 | 0 | 1 | 99 | 70 |
| Comparative Example: | | | | | | | | | | | | | | | | | |
| 1 | 10 | 25 | 0 | 0 | 0 | 30 | 900 | 2 | 420 | 65 | 17 | 6 | 5 | 1 | tr | 94 | 69 |
| 2B | 10 | 60 | 0 | 0 | 0 | 60 | 850 | 5 | 450 | 66 | 10 | 6 | 8 | 2 | 2 | 94 | 70 |
| 3B | 10 | 13 | 0 | 0 | 0 | 20 | 950 | 2 | 440 | 65 | 15 | 8 | 9 | 1 | tr | 98 | 66 |
| 4B | 10 | 25 | 2 | 0 | 0 | 30 | 900 | 2 | 430 | 48 | 15 | 6 | 5 | 3 | 2 | 79 | 61 |
| 5B | 10 | 25 | 0 | 0.5 | 0 | 30 | 900 | 2 | 450 | 64 | 6 | 4 | 3 | 0 | 2 | 79 | 81 |

Note.—AN=Acrylonitrile; ATN=Acetonitrile; AL=Acrolein; tr=Trace.

What we claim is:

1. A process for the production of acrylonitrile from propylene which comprises contacting a mixture of propylene, molecular oxygen and ammonia in the vapor phase at a temperature in the range of 350° to 550° C., said mixture having a molar ratio of oxygen/propylene of 0.5/1 to 5/1 and a molar ratio of ammonia/propylene of .7/1 to 3/1, with a heteropoly-acid catalyst having the empirical formula

$$Fe_{10}Sb_bMe_cX_dO_e$$

wherein Me represents an element selected from the group consisting of tungsten and molybdenum; X represents an element selected from the group consisting of phosphorus and boron; and b=5 to 60
c=0.05 to 1
d=0.005 to 1
e=22 to 141.

2. A process according to claim 1 wherein said catalyst is calcined at a temperature in the range of 700° to 1100° C. to activate before use.

3. A process according to claim 1 wherein the space velocity of said mixture is in the range of 100 to 1500 hr.$^{-1}$.

4. A process according to claim 1 wherein said catalyst contains 10 to 90 percent by weight of a silica carrier.

5. A process according to claim 1 wherein said catalyst is subject to heat treatment at a temperature in the range of 200° to 600° C. for 2 to 24 hours and then calcined at a temperature in the range of 700° to 1100° C. for 1 to 48 hours.

References Cited

UNITED STATES PATENTS 3,338,952   8/1967   Callahan et al. _____ 260—465.3

JOSEPH P. BRUST, Primary Examiner

U.S. Cl. X.R.

252—432, 437; 260—604